United States Patent Office 3,530,354
Patented Sept. 22, 1970

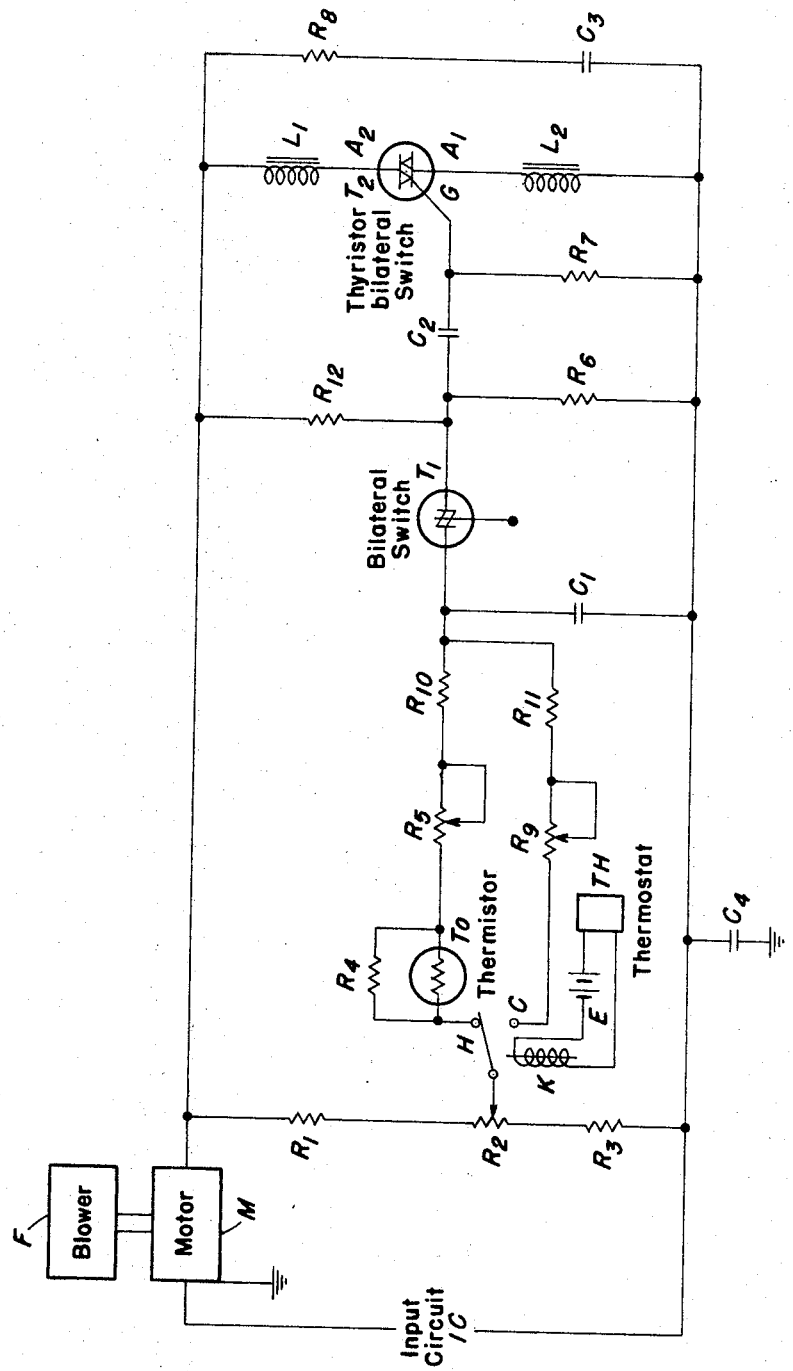

3,530,354
CONTROL CIRCUIT WITH LINE VOLTAGE COMPENSATION
George J. Granieri, Piscataway, N.J., assignor to American Standard Inc., a corporation of Delaware
Filed May 10, 1967, Ser. No. 637,376
Int. Cl. H02p 7/28
U.S. Cl. 318—345                    10 Claims

ABSTRACT OF THE DISCLOSURE

This application discloses a circuit arrangement for controlling a motor or other load connected to a source of alternating current. A capacitor is alternately charged to the positive and negative voltages of the source and these opposing charges in turn cause positive and negative pulses to be applied to a bilateral switch. The latter switch normally interposes a high impedance between the A.C. source and the load, but its impedance is reduced to a negligible value in response to the positive and negative pulses to control the flow of A.C. current through the load.

---

This invention relates to motor control systems and more especially, to systems for the control of heating and/or cooling apparatus. Still more particularly, this invention relates to arrangements of solid state circuitry set up for the control of motors and other translating equipment and, more especially, for the control of equipment which may be generally classified as heating/air conditioning equipment.

In general, this invention will be described as related to heating and cooling equipment for illustrative purposes. The invention will involve a relatively simple, compact, and inexpensive arrangement of components set up so as to continuously control the operation of a motor (or other translating device) which in turn may control a blower serving to dissipate air which has been heated or cooled.

One of the features of the control system of this invention will reside in an arrangement for maintaining the speed of the motor or other translating device substantially constant notwithstanding fairly wide changes in the voltage of the power supply connected to the motor. By this arrangement, the motor will rotate at its desired or predetermined speed and will be unaffected by external influences, such as line voltage variations in the power supply, etc. Without such an arrangement, small variations in line voltage have heretofore caused the motor to undergo wide speed changes; sometimes a relatively small line voltage variation is sufficient to cause the motor to stop or have its armature burn out.

Another of the features of this invention relates to adjustments of the circuitry for the regulation of the constants of the blower mechanism when such a mechanism is coupled to the motor. In accordance with this invention, it will be made relatively simple to fix the minimum speed of the blower mechanism, as well as its maximum speed and, in addition, its speed during phases when the furnace coupled to the blower is undergoing a normal cooling phase.

Another feature will be the employment of a very sensitive, fast responding, thermistor. The thermistor will be one which will have a fairly sharp negative temperature coefficient. The device especially suitable for this purpose will be one that may be classified as a "bead" type of thermistor.

Another feature of this invention will involve the employment of a high frequency suppression system which will serve to prevent the generation or transmission of currents or voltages of relatively high frequency. Such currents or voltages may be produced by the operation of the solid state components, particularly a Triac device which is one of the components, inasmuch as such components may be switched rather sharply and rapidly in the operation of the system.

This invention will be better understood from the more detailed description hereinafter following when read in connection with the accompanying drawing illustrating one embodiment of the invention merely for the purpose of illustration.

Referring to the drawing, the reference character IC designates the usual power supply, such as 115 v. A.C., and this source is intended to supply current for the operation of a motor M which may be coupled to a blower on fan F. The blower on fan F serves to move air through various conduits to, for example, rooms or other places in the building. The network of the input circuit IC and the motor M are bridged by three series resistors, R1, R2 and R3. The resistor R2 may be referred to as a potentiometer and its variable terminal is connected to the armature of a relay K which includes a winding connected in series with a source of voltage E and a thermostat TH. The thermostat TH may be a device, usually found in heating and air conditioning systems, which responds automatically to temperature variations of the ambient air. The armature of relay K is movable between two contacts, H and C, the H contact being closed when the relay K is released and the contact C being closed when the relay K is operated. As is well understood, the thermostat TH may cause the relay K to release when heat is to be supplied to the building and to become operated when the building is to be cooled.

The reference character T0 designates a thermistor which, for example, may be positioned in the bonnet of a furnace. It is bridged by resistor R4. It is also connected between the terminal H and the terminal common to capacitor C1 and one of the terminals of a silicon bilateral switch T1 of well known construction, the interconnection circuit including resistors R5 (a rheostat) and R10. The terminal C is connected to the same common terminal of capacitor C1 and switch T1 via a resistor R9 (another rheostat) and a resistor R11. In effect, the capacitor C1 will be connected between the movable terminal of the potentiometer R2 and the lower terminal of resistor R3 via the first mentioned circuit of thermisor T0 and resistors R5 and R10 or via the second mentioned circuit of resistors R9 and R11.

The capacitor C1 receives a charge in response to the voltage between the variable terminal of resistor R2 and the bottom terminal of resistor R3, and this charge may be reversed in polarity as the voltage of the input circuit IC changes in polarity. The capacitor C1 is connected to the gate G of the Triac T2 via the switch T1 and capacitor C2, the lower terminal of the capacitor C1 being connected to the terminal A1 of the Triac T2 by a coil L2. The capacitor C2 is bridged by a pair of resistors R6 and R7.

The circuit of the supply voltage IC and the motor M is bridged by a voltage regulating network which includes the resistors R12 and R6. As the input voltage rises, the voltage across resistor R6 will rise proportionately to slow down the operation of the switch T1. Conversely, as the input voltage falls off, the voltage across resistor R6 will recede proportionately to speed up the operation of the switch T1.

The Triac T2 is connected in a local circuit which includes the network consisting of coil L1, resistor R8, capacitor C3 and coil L2. Coils L1 and L2 together with capacitor C4 serve as a so-called "radio frequency" suppressor to substantially reduce, if not eliminate, generated voltages of substantially higher frequency than the fundamental of the A.C. voltage supplied by the input circuit IC.

Assume that the thermostat TH, having been set to respond to a predetermined temperature of the ambient air of the building, causes the relay K to release. This will connect the variable terminal of potentiometer R2 to the terminal H. The voltage at the potentiometer terminal will then be applied to the capacitor C1 of the circuit of the thermistor T0 and the resistors R5 and R10.

When the input voltage IC begins its positive phase, a corresponding positive voltage will be applied over the circuit just outlined (connected to terminal H) to apply a positive charge to capacitor C1. As the charge on capacitor C1 reaches a predetermined value, the switch T1 will be rendered conductive. The predetermined voltage for rendering switch T1 conductive will be determined by the charge on capacitor C1 and the opposing voltage across resistor R6. When such voltage has reached the predetermined value and switch T1 is rendered conductive, a positive pulse will be applied to the Triac T2 over the circuit of capacitor C2 and coil L2. When this happens, the impedance of the device T2 will diminish to a virtual nullity. Consequently, the input voltage IC will be transmitted over the circuit of the motor M via the coil L1, the device T2 and coil L2. The motor M will operate and continue to be controlled by this positive voltage as long as the device T2 exhibits minimal impedance.

Before the AC voltage of source IC returns to its nodal point and then develops the negative phase of its cycle, the capacitor C1 is discharged. The discharge path will be established by the circuit of device T1 and resistor R6 and also by another circuit previously described as extending between the movable point of potentiometer R2, terminal H, the device T0 and resistors R5 and R10. Simultaneously, the capacitor C2 will be discharged over the circuit of resistors R6 and R7 which bridge that capacitor.

As the phase of the voltage applied by source IC becomes negative, the capacitor C1 will then be charged in a negative direction. The charging circuit will extend from the movable contact of potentiometer R2 through thermistor T0 and resistors R5 and R10 (which compose the prior charging circuit). When the negative charge on capacitor C1 reaches a predetermined value (which is similar to its earlier predetermined value), the switch T1 will be reduced in impedance to a virtual nullity.

Hence, a negative pulse will be applied to the gate terminal G of the device T2 via switch T1 and capacitor C2. The capacitor C2 will now be charged in the negative direction. The negative voltage applied to the gate G will again render the device T2 highly conductive, that is, of negligible impedance, whereupon the motor M will continue in operation at substantially the same speed as before.

Before the alternating voltage of source IC has returned to its nodal point, capacitors C1 and C2 will be discharged over the same respective circuits as previously described. The control circuit will then be returned to its normal conditions.

It will be observed that the motor M is started during one phase of the applied AC voltage and that it will continue to operate during the opposite phase of the same applied AC voltage. This is primarily due to the establishment of rapid, successive pulses of opposite polarity applied through gate G to the device T2 serving to reduce its impedance to a nullity and maintain it essentially in the same state. The motor M naturally has considerable momentum and will therefore remain in operation even while the applied voltage transverses the low voltage stage of its cycle. Thus, as thermistor T0 responds to variations in bonnet temperatures, the motor M modulates its speed from minimum at low bonnet temperatures to maximum at high bonnet temperatures.

When the ambient temperature has caused the thermostat TH, as previously adjusted, to go into its cooling condition, the relay K will be operated to cause its armature to close contact C. Upon the closure of contact C, the voltage of potentiometer R2 will be applied to charge the capacitor C1 and this in turn will cause the switch T1 to drop in impedance when the voltage across the capacitor C1 has reached a predetermined value. This in turn will cause the device T2 to drop in impedance, already explained so that the motor M may again be operated. In this case, the blower F, which is coupled, for example, to an air conditioning system, will transmit cooling air to the premises. It will be observed that the thermistor T0 is excluded from the circuit for charging capacitor C1 when the contact C is closed.

When the phase of the applied voltage is reversed, that is, when it is negative, the charge on capacitor C1 will be rendered negative. The device T1 will be reduced in impedance. As the charge reaches a predetermined negative value, the device T2 will be reduced in impedance in response to a negative pulse which is applied to that device. The motor M will continue in operation to cause the blower F to supply a cooling medium to the premises.

The above mentioned cycles, that is, for heating when contact H is closed and for cooling when contact C is closed, are repetitive and continue as long as the thermostat TH signals for the transmission of a heating medium or a cooling medium as the case may be.

As already suggested, any change in the terminal voltage of the source IC will develop a corresponding change in the voltage across resistor R6. Hence the opposing voltage developed by resistor R6 will require a larger charge on capacitor C1 before rendering device T1 conductive. This will take a greater time interval. On the other hand, as the input voltage falls off, a corresponding lower voltage developed across resistor R6 will serve to speed up the operation of the switch device T1. It will be apparent that the change in the timing will necessarily affect the timing cycle of operation of the switch T2. However, the speed of the motor M will remain constant under these conditions.

In one arrangement used in carrying out the principles of this invention, the components of the circuitry were as follows:

| Quantity | Designation | Description |
|---|---|---|
| 1 | $R_1$ | Resistor, fixed composition carbon 4.7kΩ, ½ watt, ±10% Mil. No. RC 20GF—472k. |
| 1 | $R_2$ | Resistor, variable 5kΩ, 3 watt, Mallory Mr 5000 P. |
| 1 | $R_3$ | Resistor, fixed composition carbon 2.2kΩ, ½ watt, ±10% Mil. No. RC 20GF—222k. |
| 1 | $R_4$ | Resistor, fixed composition carbon 150kΩ, ½ watt, ±10% Mil. No. RC 20GF—154k. |
| 2 | $R_5$ and $R_9$ | Resistor, variable, 100kΩ, ¼ watt MTC—4 Mallory. |
| 1 | $R_6$ | Resistor, fixed composition carbon 12kΩ, ½ watt, ±10% Mil. No. RC 20GF—123k. |
| 1 | $R_7$ | Resistor, fixed composition carbon 1kΩ, ½ watt, ±10% Mil. No. RC 20GF—102k. |
| 1 | $R_8$ | Resistor, fixed composition carbon 820Ω, ½ watt, ±10% Mil. No. RC 20GF—821k. |
| 2 | $R_{10}$ and $R_{11}$ | Resistor, fixed composition carbon 27kΩ, ½ watt, ±10% Mil. No. RC 20GF—273k. |
| 1 | $R_{12}$ | Resistor, fixed composition carbon 120kΩ, ½ watt, ±10% Mil. No. RC 20GF—124k. |
| 1 | $C_1$ | Capacitor, .047μf., ± 10%, 200 v.DC Amperex Electronic Corporation C296 AB/A47K. |
| 2 | $C_2$ and $C_3$ | Capacitor, .068μf., ± 10%, 200 v.DC Amperex Electronic Corporation C296 AB/A68K. |
| 1 | $C_4$ | Capacitor, .022μf., ± 10%, 200 v.DC Amperex Electronic Corporation C296 AB/A22K. |
| 1 | $T_1$ | Silicon bilateral switch General Electric D13E1. |
| 1 | $T_2$ | Triac, 200 volt, 10 amp. G.E. type SC46B or equivalent. |
| 2 | $L_1$, $L_2$ | Toroidal choke 16 turns of No. 16 wire on Magnetics, Inc. core 55117-A2. |
| 1 | | Heat sink for Triac Wakefield—NC-301 RR. |
| 3 | | Shafts for pots Mallory Type MRS 375. |
| 1 | $T_0$ | Fenwal Thermistor type GA47J1. |

While this invention has been shown and described in a certain particular arrangement merely for the purpose of illustration, it will be apparent then that the general principles of this invention may be applied to other and widely varied organizations without departing from the spirit of the invention and the scope of the appended claims.

What is claimed is:

1. A control circuit for interconnecting a source of alternating current to a load and maintaining the current through the load substantially constant notwithstanding large variations in the voltage of said source, comprising a capacitor which is charged during each half cycle of the applied alternating current to a voltage which corresponds to the instantaneous value of the current and polarity of the source, an impedance which receives a voltage corresponding to the instantaneous voltage of said source, a first bilateral switch connected to said capacitor and said impedance and responsive to the charge on said capacitor reaching a predetermined positive value to generate a positive pulse and in response to the charge on said capacitor reaching a predetermined negative value to produce a negative pulse, a second bilateral switch arrangement coupled to the first switch arrangement, the second switch arrangement exhibiting a high impedance but changing in impedance to a low value in response to each positive pulse and each negative pulse, said second switch arrangement being connected in series with the alternating current source and the load so that the load will be fed alternating current from said source substantially continuously through said second switch arrangement.

2. A control circuit according to claim 1, in which the impedance comprises resistive means connected in series with said capacitor and said first bilateral switch arrangement to set the value of the predetermined voltage at which a positive pulse or a negative pulse will be produced.

3. A control circuit according to claim 2, including in addition, a filter circuit coupled to the second bilateral switch arrangement for substantially suppressing alternating current voltages having frequencies above the fundamental of the source of alternating current.

4. In an air conditioning system, a motor, a blower mechanically coupled to the motor, a relay, means responsive to temperature variations to operate or release said relay, a source of alternating current, a capacitor, means responsive to each operation and to each release of said relay to charge said capacitor to a voltage which corresponds to the instantaneous value of the voltage and polarity of said source, a first bilateral switch device coupled to said capacitor and responsive to the voltage on said capacitor exceeding a predetermined value of one polarity to produce a positive pulse and responsive to the charge on said capacitor exceeding a predetermined value of the opposite polarity to produce a negative pulse, a second bilateral switch device coupled to said first switch device and exhibiting a high impedance, means responsive to each positive pulse and to each negative pulse to change the impedance of said second switch device to a low value, said second switch device being connected in series with said source of alternating current and said motor so that said motor will be fed alternating current from said source substantially continually applied through said second switch device, and means whereby said motor will be maintained at a substantially constant speed notwithstanding wide variations in the voltage applied thereto, said latter means including an impedance device coupled to said source of alternating current and said first bilateral switch and developing a voltage to oppose the voltage to which said capacitor is charged.

5. In an air conditioning system, the combination according to claim 4 in which the impedance device comprises resistive means connected in series with said capacitor and said first bilateral switch device to set the value of the predetermined voltage at which a positive pulse or a negative pulse will be produced.

6. In an air conditioning system, the combination according to claim 5 including, in addition, a filter circuit coupled to the second bilateral switch device for substantially suppressing alternating current voltages having frequencies above the fundamental of the source of alternating current.

7. A control circuit for maintaining a rotor substantially constant in speed and operating substantially continuously in response to both polarities of a source of alternating voltage applied to the rotor and maintaining said rotor at a substantially constant speed even when the source of alternating voltage coupled to the rotor undergoes wide voltage variations, comprising a capacitor coupled to said source and charged to the opposing polarities of the voltage of the source, a bilateral solid state switch device, a first impedance device connected in a local circuit with said capacitor and said switch device, a second impedance device interconnecting said source with said rotor and said first impedance device so that said first impedance device will change in magnitude in response to polarity changes in the voltage of said source and produce a counter-voltage to control the operation of said switch device, whereby the operation of said switch device will be advanced or retarded according to the changes in the magnitude of the counter-voltage applied to said first impedance device.

8. A control circuit according to claim 7 which includes, in addition, means to charge the capacitor to voltages which correspond to the instantaneous values of the voltage and polarity of the alternating voltage source.

9. A control circuit according to claim 8 including, in addition, a second bilateral solid state switch device coupled through the first switch device to said capacitor, said second switch device undergoing alternate changes in impedance with each charge of the capacitor to a value exceeding a predetermined value, said second switch device being coupled to the rotor to enable the rotor to operate only during repetitive changes in impedance of the second switch device.

10. A control circuit according to claim 9 including, in addition, a network coupled to the second switch device to substantially suppress alternating voltages having frequencies exceeding the fundamental frequency of the source of alternating voltage.

References Cited

UNITED STATES PATENTS

| | | | |
|---|---|---|---|
| 3,367,408 | 2/1968 | Moreland | 318—334 X |
| 3,402,338 | 9/1968 | Thoresen | 318—345 X |
| 3,403,315 | 9/1968 | Maynard | 318—345 X |

ORIS L. RADER, Primary Examiner

T. LANGER, Assistant Examiner

U.S. Cl. X.R.

318—334